United States Patent
Dohner et al.

(10) Patent No.: US 11,836,910 B1
(45) Date of Patent: Dec. 5, 2023

(54) ESTIMATION USING IMAGE ANALYSIS

(71) Applicant: United Services Automobile Association (USAA), San Antonio, TX (US)

(72) Inventors: Robert Kenneth Dohner, San Antonio, TX (US); Kristina Tomasetti, San Antonio, TX (US); John McChesney TenEyck, Jr., San Antonio, TX (US); David Golia, San Antonio, TX (US); Robert S. Welborn, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 2 days.

(21) Appl. No.: 17/498,427

(22) Filed: Oct. 11, 2021

Related U.S. Application Data

(63) Continuation of application No. 16/673,492, filed on Nov. 4, 2019, now Pat. No. 11,176,659, which is a continuation of application No. 15/870,509, filed on Jan. 12, 2018, now Pat. No. 10,510,142.

(60) Provisional application No. 62/445,971, filed on Jan. 13, 2017.

(51) Int. Cl.
*G06T 7/00* (2017.01)
*G06Q 30/0201* (2023.01)
*G06Q 50/10* (2012.01)

(52) U.S. Cl.
CPC ....... *G06T 7/0008* (2013.01); *G06Q 30/0206* (2013.01); *G06Q 50/10* (2013.01); *G06T 7/97* (2017.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,141,611 A * | 10/2000 | Mackey | G07C 5/0891 340/904 |
| 9,300,678 B1 | 3/2016 | Stack et al. | |
| 10,510,142 B1 | 12/2019 | Dohner et al. | |
| 10,534,968 B1 * | 1/2020 | Clauss | G06V 30/224 |
| 11,176,659 B1 | 11/2021 | Dohner et al. | |
| 11,288,789 B1 * | 3/2022 | Chen | G06T 7/001 |
| 2013/0287265 A1 | 10/2013 | Nepomniachtchi et al. | |

(Continued)

*Primary Examiner* — Leon Viet Q Nguyen
(74) *Attorney, Agent, or Firm* — Fish & Richardson P.C.

(57) ABSTRACT

Techniques are described for performing estimations based on image analysis. In some implementations, one or more images may be received of at least portion(s) of a physical object, such as a vehicle. The image(s) may show damage that has occurred to the portion(s) of the physical object, such as damage caused by an accident. The image(s) may be transmitted to an estimation engine that performs pre-processing operation(s) on the image(s), such as operation(s) to excerpt one or more portion(s) of the image(s) for subsequent analysis. The image(s), and/or the pre-processed image(s), may be provided to an image analysis service, which may analyze the image(s) and return component state information that describes a state (e.g., damage extent) of the portion(s) of the physical object shown in the image(s). Based on the component state information, the estimation engine may determine a cost estimate to repair and/or replace damaged component(s).

15 Claims, 5 Drawing Sheets

(56) References Cited

U.S. PATENT DOCUMENTS

2017/0352104 A1   12/2017  Hanson et al.
2018/0040039 A1*  2/2018  Wells .................... G06Q 40/08
2018/0300576 A1   10/2018  Dalyac et al.
2021/0235357 A1*  7/2021  Lagassey .............. G08G 1/205

* cited by examiner

| Component state information 120 |||
|---|---|---|
| Component ID 202(1) | State 204(1) | Confidence level 206(1) |
| Component ID 202(2) | State 204(2) | Confidence level 206(2) |
| Component ID 202(3) | State 204(3) | Confidence level 206(3) |

⋮

Example 208

```
<component_record>
        <component_ID = "left front quarter panel">
        <component_state = 0.5>
        <confidence = 0.87>
</component_record>

<component_record>
        <component_ID = "left front door">
        <component_state = 0.8>
        <confidence = 0.72>
</component_record>

<component_record>
        <component_ID = "windshield">
        <component_state = 0.0>
        <confidence = 0.92>
</component_record>
```
⋮

*FIG. 2*

ESTIMATION USING IMAGE ANALYSIS

CROSS-REFERENCE TO RELATED APPLICATION

This application is a continuation application of and claims priority under 35 U.S.C. § 120 to U.S. application Ser. No. 16/673,492, filed Nov. 4, 2019, which is a continuation application of and claims priority to U.S. application Ser. No. 15/870,509, filed on Jan. 12, 2018, which is related to, and claims priority to, U.S. Provisional Patent Application Ser. No. 62/445,971, titled "Estimation Using Image Analysis," which was filed on Jan. 13, 2017, the entirety of each of which are incorporated by reference into the present disclosure.

BACKGROUND

Following an accident that causes damage to an insured object, such as a vehicle, the damaged object is typically examined to determine the extent of the damage and/or the cost to repair the damage. Traditionally, such an examination involves an inspection of the damaged object by one or more individuals, which may be time-consuming and expensive. Moreover, the individuals performing the inspection may have varying degrees of expertise and/or diligence. Accordingly, the repair cost estimates determined through the traditional process may be inaccurate.

SUMMARY

Implementations of the present disclosure are generally directed to a determining cost estimates for physical objects. More particularly, implementations of the present disclosure are directed to determining repair cost estimates for a physical object, based on results of analyzing one or more images of the damaged object.

In general, innovative aspects of the subject matter described in this specification can be embodied in methods that include operations of: receiving at least one image of a physical object, the at least one image generated using an image capture device; transmitting the at least one image to a computer-implemented image analysis service and receiving, in response, component state information indicating a state of at least one component of the physical object, the state determined based on an analysis of the at least one image by the computer-implemented image analysis service; based at least partly on the component state information, determining cost estimate information that describes a cost corresponding to the state of the at least one component of the physical object; and transmitting the cost estimate information for presentation on a computing device.

These and other implementations can each optionally include one or more of the following innovative features: the physical object is a vehicle; transmitting the cost estimate information includes communicating the cost estimate information to a service provider for repairing the physical object; the operations further include performing at least one pre-processing operation prior to providing the at least one image to the image analysis service; the at least one pre-processing operation includes one or more of fraud checking, image sufficiency checking, or image adjustment; image sufficiency checking includes checking that the at least one image is from at least a minimum number of different viewpoints to enable the image analysis service to determine the component state information; image sufficiency checking includes checking that the at least one image has a minimum contrast level; the component state information further includes a confidence level for the state determined for the at least one component; the operations further include receiving information indicating prior damage to one or more components of the physical object; the cost estimate information is further based on the prior damage; and/or the cost is to repair or replace the at least one component of the physical object.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. Through cost estimation based on image analysis, implementations provide cost estimates that are more accurate, consistent, and objectively determined than estimates developed in traditional settings which may vary based on the varying expertise and diligence of the estimator, and which may depend on the subjective opinions of the estimator. Because implementations provide more accurate and reliable cost estimates compared to traditional methods, implementations also consume less processing power, network capacity, storage space, active memory, and/or other computing resources compared to systems that support traditional estimation techniques, given that such traditional systems may be required to repeat processing of an estimation operation to recover from inaccurate estimates. Moreover, implementations enable cost estimation to be performed in real time in response to receiving image(s) of a damaged object, reducing the amount of time needed to respond to the damage-causing incident (e.g., accident). Such real-time estimation also enables other follow-up actions to be performed in real time with respect to the analysis. For example, a determination may be made in real time whether to send a vehicle to a repair shop or a salvage yard based on the real time image analysis and cost estimation following an accident, thus avoiding the cost of storing a vehicle until a traditional manual inspection can be performed. Moreover, implementations reduce storage costs and/or repair times in some instances. For example, the parts for the vehicle can be ordered at the time of the estimate so that parts that need shipping, customization, and/or manufacturing can have a shorter lead time, thus reducing the storage costs and the time to repair.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 2 depicts an example schematic of component state information employed in estimation, according to implementations of the present disclosure.

DETAILED DESCRIPTION

Figure 1:
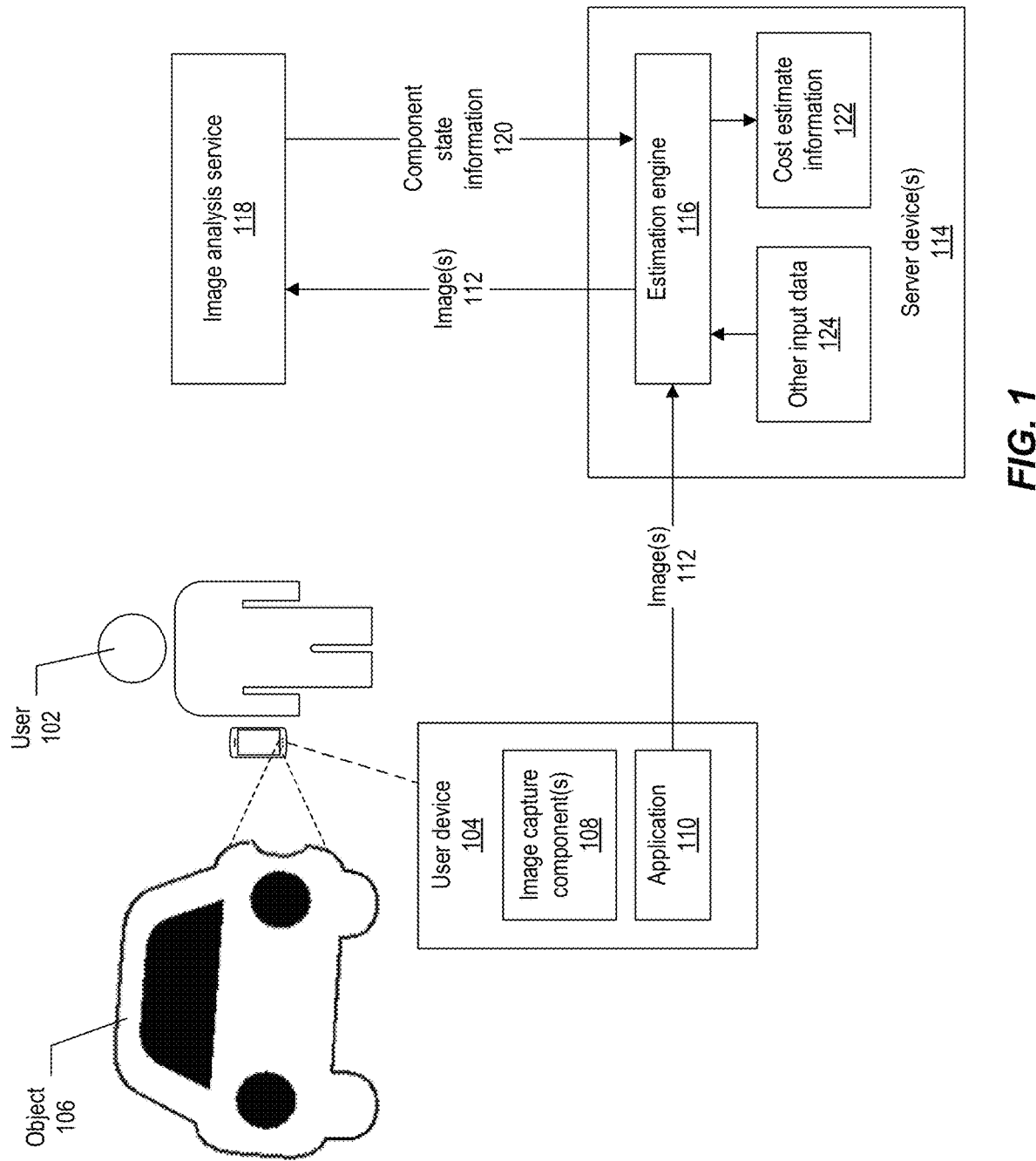
FIG. 1 depicts an example system for estimation based on image analysis, according to implementations of the present disclosure.

Implementations of the present disclosure are directed to systems, devices, methods, and computer-readable media for performing estimations based on image analysis. In some implementations, one or more images may be received. The image(s) may be captured by image capture component(s) (e.g., a camera) of a user device, such as the user's smartphone, tablet computer, wearable computer, or other suitable computing device. The image(s) may be of one or more portions of a physical object, such as a vehicle, building, or other tangible object. In some instances, the image(s) may show damage that has occurred to the portion(s) of the physical object. For example, a user may use their smartphone to capture one or more image(s) of their automobile after an accident, and the image(s) may show dents, crumpling, broken windows, and/or other types of damage caused by the accident.

The image(s) may be communicated to an estimation engine executing on at least one server computing device. In some implementations, the estimation engine may perform one or more pre-processing operations on the image(s), such as operation(s) to excerpt one or more portion(s) of the image(s) for subsequent analysis. The image(s), or the pre-processed image(s), may be provided to an image analysis service. The image analysis service may analyze the image(s) and return component state information that describes a state (e.g., damage extent) of one or more components of the physical object shown in the image(s). Based on the component state information, the estimation engine may determine a cost estimate, such as an estimate of the cost to repair at least some of the damage shown in the image(s) and/or replace one or more damaged components.

Through the use of image analysis to determine repair and/or replacement costs, implementations provide a more accurate estimate than that which may be determined through traditional inspection of the damaged object. Moreover, implementations provide for an estimation process which may be performed more quickly and more efficiently compared to a traditional inspection, given that the image-based analysis of the damage may be performed through execution of the estimation engine without the need for a manual inspection to determine damage extent and cost of repair or replacement. In some instances, the image-based cost estimation process may be performed in real time relative to receiving the image(s).

In some implementations, the cost estimates are based at least partly on the time to complete an estimate, appraiser time, testing equipment, and/or material costs. Part of the learning performed by the algorithm is due to the availability of a large number (e.g., approximately 1.5 million per year, over more than 10 years) estimates with detailed parts lists in one or more databases. Such estimates can also include images, enabling the algorithm analyze the images and learn what parts need to be replaced in instances that exhibit similar damage. In this way, the algorithm can learn how to generate the estimate, and/or learn how to generate a more accurate estimate, by examining millions of vehicles and determining the extent and type of damage.

FIG. 1 depicts an example system for estimation based on image analysis, according to implementations of the present disclosure. As shown in the example of FIG. 1, a user 102 may employ a user device 104 to capture one or more images 112 of a damaged object 106. The user device 104 may be a portable (e.g., mobile) computing device such as a smartphone, tablet computer, wearable computer, and so forth. The user device 104 may be any other suitable type of computing device. The user device 104 may include one or more image capture components 108. The image capture component(s) 108 may include hardware components of the user device 104, such as a camera configured to capture still image(s) and/or video of a scene. The image capture component(s) 108 may also include software components configured to control the camera(s) and/or process the image and/or video data captured by the camera(s). In some instances, the image capture component(s) 108 may be external to the user device 104, and may communicate with the user device 104 over one or more wired or wireless networks. For example, an external camera may connect with the user device 104 over a wireless (e.g., Bluetooth™) connection, and processes executing on the user device 104 may employ the external camera to capture image(s) and/or video data. The user device 104 may also be described as an image capture device.

Although FIG. 1 depicts the object 106 as a vehicle (e.g., an automobile), implementations provide for image-based cost estimation for other appropriate types of physical objects as well. For example, the physical object 106 may be a house, apartment, condominium, office, industrial facility, hotel room, and/or other type of structure or room(s) of a structure. The physical object 106 may be another type of vehicle such as a motorcycle, aircraft, watercraft, bicycle, and so forth. The physical object 106 may be a piece of furniture, work of art, tree or other type of plant, and so forth.

The user device 104 may execute an application 110, which may also be described as a user application or app. The application 110 may receive one or more images 112 captured by the image capture component(s) 108. In some instances, the image capture component(s) 108 may generate the image(s) 112 and store the image(s) 112 in memory on the user device 104 or elsewhere, and the application 110 may retrieve the image(s) 112 from the memory. In some instances, the application 110 may receive the image(s) 112 (e.g., directly) from the image capture component(s) 108 without intermediary storage of the image(s) 112. The image(s) 112 may include any appropriate number of still image(s), and/or video data of any suitable size.

The application 110 may communicate the image(s) 112, over one or more networks, to one or more server devices 114. The server device(s) 114 may include any suitable number and type of computing device(s). In some instances, the server device(s) 114 include server(s) for distributed computing and/or cloud computing. The server device(s) 114 may execute an estimation engine 116. The estimation engine 116 may receive the image(s) 112, and communicate the image(s) 112 to an image analysis service 118. The image analysis service 118 may be remote from the server device(s) 114 and may be provided by one or more other computing device(s). In such instances, the estimation engine 116 may communicate with the image analysis service 118 over one or more networks. In some instances, the image analysis service 118 may execute on the same server device(s) 114 as the estimation engine 116.

The image analysis service 118 may analyze the image(s) 112 and generate component state information 120 that describes, for one or more components of the object 106, an extent of damage to the component. The component state information 120 is described further with reference to FIG. 2. The component state information 120 may be received by the estimation engine 116 and employed to determine cost estimate information 122. The cost estimate information 112 may be communicated and/or otherwise provided to one or more computing devices for presentation through a user interface (UI). The cost estimate information 122 may include a cost to repair and/or replace each of one or more damaged components of the object 106, and/or the cost to repair the object 106 as a whole.

In some implementations, the image analysis service 118 may employ machine learning (ML) techniques to analyze the image(s) 112. Such ML techniques may include, but are not limited to, techniques that employ deep learning neural networks for pattern recognition within the image(s) 112, or to perform other types of analysis. Moreover, in some implementations the estimation engine 116 may also employ ML techniques to generate the cost estimate information 122 based at least partly on the component state information 120. ML techniques may include supervised and/or unsupervised ML techniques.

In some implementations, the application 110 may present the image(s) 112 of the object 106 and prompt the user 102 to provide more information regarding the image(s) 112 and/or the situation. For example, the user 102 may be prompted to input a cause or other circumstances of the accident, and such information may be provided to the estimation engine 116 with the image(s) 112. The estimation engine 116 may take such information into account when determining the cost estimate information 122. For example, the cost estimate information 122 may include insurance-related information such as a covered cost, claim amount to be paid, claim amount to not be paid, deductible to be paid by the user 102, and so forth, and these amounts may be determined based at least partly on the cause and/or other circumstances of the accident. In instances where implementations are employed within an insurance context, the estimation engine 116 may also perform other operations such as confirming that the user 102 has a current, active, and valid insurance policy that covers the object 106.

In some implementations, the application 110 may present the image(s) 112 and prompt the user 102 to note those areas of damage which may have been present prior to the accident, such as pre-existing dents or scratches on a vehicle. The application 110 may enable the user 102 to note the previous areas of damage by circling, or otherwise indicating, those portions of the image(s) 112 that show previous damage. In such instances, the previous damage information may be communicated to the estimation engine 116, and the estimation engine 116 may take the previous damage into account when generating the cost estimate information 112. For example, the cost estimate information 122 may include a cost of repairing and/or replacing component(s) that were damaged in the current accident, but may omit the cost of repairing and/or replacing those component(s) that were already damaged prior to the accident. In some implementations, the estimation engine 116 may access previously received image(s) of the object 106 that are stored on the server device(s) 114 or elsewhere. The estimation engine 116 may compare the previously received image(s) with the current image(s) 112 of the object 106 to determine whether any of the damage shown in the image(s) 112 was already present prior to the accident. In some implementations, the estimation engine 116 may indicate previous damage to the image analysis service 118, and image analysis service 118 may generate the component state information 120 to not reflect the previous damage.

In some implementations, the cost estimate information 122 may be determined in real time relative to receiving the image(s) 112, and/or shortly following the accident that caused the damage to the object 106. As used herein, a real time action is an action that is performed immediately following a triggering event, accounting for the time needed to communicate and/or process information. A real time action may be performed synchronously with respect to the triggering event, and/or within a same execution path as the detection of the triggering event. For example, in response to a triggering event of receiving the image(s) 112, the estimation engine 116 may: pre-process the image(s) 112, send the image(s) 112 to the image analysis service 118, receive the component state information 120 from the image analysis service 118 (e.g., synchronously with sending the image(s) 112 to the service 118), determine the cost estimate information 122, and/or provide the cost estimate information 122 for presentation in the UI of one or more computing device(s) such as the user device 104 and/or other device(s). Such real time processing may also enable other action(s) to be performed in real time. For example, determining the cost estimation information 122 in real time shortly following an accident may enable a determination to be made, in real time, whether a damaged vehicle is to be sent to a salvage yard (e.g., if the vehicle is a total loss) or to a repair shop. The cost estimate information 122 and/or other (e.g., insurance-related) information may also be communicated to the repair shop in real time, to expedite repair of the object 106.

In some implementations, the estimation engine 116 may perform one or more pre-processing operations on the image(s) 112 prior to sending the image(s) and/or pre-processed image(s) to the image analysis service 118. Pre-processing may include one or more of the following: fraud checking, image sufficiency checking, and/or image adjustment.

With respect to fraud checking, the estimation engine 116 may perform certain operation(s) that attempt to detect and prevent possibly fraudulent insurance claims. For example, the information received from the user device 104 may be checked for consistency with other information that describes the user 102, user device 104, and/or object 106. In some implementations, a vehicle identification number (VIN) of the object 106 may be retrieved from the image(s) 112, and compared to information describing one or more insured vehicles of the user 102, to confirm that the vehicle is covered by a valid policy of the user 102. Make, model, year, color, and/or other descriptive information regarding the vehicle may also be retrieved from the image(s) 112 and compared to information describing the insured vehicles of the user 102, to confirm the vehicle is covered. Inconsistencies may indicate possible fraud.

In some instances, fraud checking may also be performed based on geographic location information that is embedded in the image metadata and/or otherwise received from the user device 104. Such information may be compared to address information for the user 102 to determine whether the accident occurred in an area typically frequented by the user 102. If the location indicated in the image metadata and/or the current location of the user device 104 differs from the typical location of the user 102, the estimation engine may flag the image(s) 112 as possibly fraudulent.

Fraud checking may include verifying the user's identity. The identity of the user 102 may be verified, and/or the user may be authenticated, through use of user-provided credentials (e.g., username, password, PIN, etc.), biometric data (e.g., fingerprint verification, facial recognition, voice print identification, etc.), and/or other techniques.

Fraud checking may also include verifying other information provided by the user 102 through the application 110. In instances where the user 102 provides information describing the cause of the accident, such information may be checked against other sources of information for consistency. For example, if the user indicates that a vehicle was damaged during a flood, the estimation engine 116 may access weather and/or disaster relief information to verify that flooding is occurring in the user's vicinity. As another example, if the user indicates that the vehicle was damaged in an accident with another vehicle, the estimation engine 116 may access traffic camera data, police records, and/or other sources of information to verify that an accident occurred.

Pre-processing may include image sufficiency checking to determine whether the received image(s) 112 include sufficient information for further analysis. For example, the estimation engine 116 may analyze the received image(s) 112 to determine whether there is enough contrast in the image(s) 112 to identify the object 106 and/or discern the damage to the object 106. The image(s) 112 may also be checked to verify that there are enough image(s) 112, captured from a sufficient number of different viewpoints, locations, and/or angles, to be useable for further analysis. If the image(s) 112 are insufficient with respect to contrast, number of angles, and/or other criteria, the estimation engine 116 may instruct the application 110 to present a message describing the insufficiency of the image(s) 112 to prompt the user 102 to provide more and/or different image(s) 112.

In some implementations, the application 110 may provide guidance to the user regarding the image(s) 112 to be captured. For example, the application 110 may provide guidance regarding the angles at which image(s) are to be taken, the size of the image(s), and so forth. The application 110 and/or the estimation engine 116 may determine whether image(s) 112 are sufficient for the analysis. The application 110, based on its own analysis of the image(s) and/or on instructions from the estimation engine 116, may request that the user use the device to capture another set of images to reduce glare, eliminate obstructions, obtain better focus, and/or otherwise improve on the initial image(s) to generate image(s) that are suitable for analysis. In some implementations, the application 110 may provide a visualization that includes a wireframe or other indicator showing where, in the frame, the damage is to be located, to help the user take image(s) that are suitable for analysis.

In some implementations, pre-processing may include image adjustment, such as adjusting the size, format, color palette, resolution, and/or other characteristics of the image(s) 112 prior to sending them to the image analysis service 118. Image adjustment may also include sub-windowing and/or otherwise extracting portion(s) of the image(s) 112 for further processing. For example, the image(s) 112 may be cropped and/or excerpted to focus on those portion(s) of the image(s) 112 that show the object 106 and/or the damaged portion(s) of the object 106.

In some implementations, estimation engine 116 may access other input data 124 which is used to determine the cost estimate information 122. For example, the other input data 124 may include information describing the cost of labor and/or parts in various regions, which may be used to determine the cost estimate information 122 based on the component state information 120. The cost estimate information 122 may also be based on other input data 124 that describes a history of similar damage to other (e.g., similar) vehicles, and the cost of previously repairing such damage. In some instances, such historical information may be employed to adjust an initial cost estimate based on how prior estimates compared to the cost of actual repair or replacement in previous instances. In some implementations, the estimation engine 116 may employ a ML-based model that is trained using training data that includes prior cost estimates and actual cost information. Accordingly, the estimation engine 116 may be trained over time to develop a more accurate cost estimate based on the previous divergence between estimates and actual cost.

Other input data 124 may also include one or more of the following: weather data, traffic data (e.g., traffic camera and/or stoplight camera images), information from other vehicles, information from other sensors that are fixed or mobile (e.g., drone-mounted), police and/or accident reports, social media data, auto shop and/or other service information, data (e.g., real time data) describing location of tow trucks, and so forth. In some implementations, the other input data 124 may include data from in-vehicle computing devices and/or sensors, such as onboard automotive computers, telematics devices, and/or sensors to determine speed, orientation, location, acceleration/deceleration, braking, fuel consumption, temperature, air pressure, ambient sound, and/or other data.

In some implementations, the other input data 124 includes telematics data that is collected and/or generated by an on-board system on the vehicle, and/or other sensor device(s) that are incorporated into the vehicle. Such telematics data can be used in conjunction with the image(s) and/or component state information 120 to provide greater confidence that the damage analysis and/or cost estimate is accurate. In some instances, the telematics data may include acceleration information (e.g., collected by accelerometer sensor devices and/or other suitable sensors) that indicates an acceleration or deceleration of the vehicle along one or more references axes (e.g., in three dimensions), at one or more times. Such acceleration data can also describe a force vector, indicating forces that are applied to the vehicle in one or more directions, at one or more times. The telematics data may also include sensor data generated by fault sensors in various vehicle components, which indicate damage to and/or failure of the component(s). The telematics data can be used in conjunction with the image data and/or component state information to develop greater confidence that the damage inferred based on the image(s) is actually present on the vehicle. For example, apparent damage to a right panel on the vehicle may be correlated with telematics data indicating a force applied to the right side of the vehicle (e.g., an impact from another vehicle), to develop higher confidence that the damage to the right panel is accurately identified and cost-estimated. Telematics data can also be employed to develop a more accurate estimate of the degree of damage to a vehicle component. For example, the telematics data can be used to distinguish whether damage caused to a bumper of the vehicle was caused by a glancing blow (e.g., less force) versus a full-on collision (e.g., greater force).

In some implementations, the estimation engine 116 may identify damaged components with varying degrees of specificity. For example, damage may be identified to a larger part (e.g., the right side of the vehicle) and/or to sub-components (e.g., a right front panel, right passenger door, etc.). Damage may also be inferred to non-visible parts of the vehicle, based on the damage that is visible in the image(s). For example, based on particular damage to a bumper, which is visible in the image(s), an inference can be made that some underlying structure below the bumper has also been damaged, based on a degree of damage shown to the bumper. Such inferences may be based on vehicle structural information that describes the underlying structure, material composition, design, and/or other aspects of the particular vehicle being imaged and analyzed. Vehicle structural information may be accessed from a database on the server device(s) 114 and/or through a remote service.

In the example of FIG. 1, the image(s) 112 are uploaded to the estimation engine 116 from the user device 104. In some implementations, the image(s) 112 are uploaded to some other service, which then communicates the image(s) to the estimation engine 116 directory and/or via one or more intermediary services, interfaces, and/or other software modules on one or more computing device(s). In some implementations, the image(s) 112 may be communicated from the user device 104 to the image analysis service 118, instead of passing through the estimation engine 116 as an intermediary.

FIG. 2 depicts an example schematic of component state information employed in estimation, according to implementations of the present disclosure. As shown in the example of FIG. 2, the component state information 120 may include any appropriate number of records that each describe, for a particular object 106, a component of the object 106. A record may include a component identifier (ID) 202 that identifies the component. The component ID 202 may be a name, description, ID number, and/or other type of ID. A record may describe the state 204 of the object 106, determined through analysis of the image(s) 112. In some instances, the state 204 may provide a measure of the amount of damage to the component. The state 204 may be a percentage damage, for example from a minimum value (e.g., 0) to a maximum value (e.g., 1 or 100) where the maximum indicates total damage and the minimum value indicates no damage. The state 204 may also be descriptive, such as "dent with 2 cm diameter." In some implementations, a record also includes a confidence level 206 indicating a degree of confidence in the state 204 information. For example, the image analysis service 118 may determine with 0.50 confidence level (e.g., from 0 to 1) that a particular component is 75% damaged, and may determine with 0.75 confidence level that another component is 90% damaged, and so forth. Accordingly, the state 204 and the confidence level 206 may be independently determined by the image analysis service 118. The component state information 120 may be described as a set of name-value pairs, with component ID 202 being the name, and the state 204 being the value, in which each name-value pair may include a confidence level 206 indicating a determined accuracy of the state estimate.

Implementations support varying degrees of granularity for identifying components of the object 106. For example, a vehicle may include components passenger-side front door, driver-side rear door, and so forth, and/or more granular components such as passenger-side front door window, passenger-side front door handle, passenger-side front door panel, passenger-side front door window mechanism, and so forth. In some implementations, the component state information 120 may include records for components with different specificity. For example, the component state information 120 may include a record for the passenger-side front door as a whole as well as record(s) for sub-components of that component, such as for the window, panel, and/or other sub-components of the passenger-side front door. In some implementations, the component state information 120 may include a record describing the state 204 of the object 106 as a whole (e.g., the highest-level component of the object). For example, a state 204 of 95% damage for a whole vehicle may be used to determine that the vehicle is a total loss, such that it may be more cost-effective to replace the vehicle instead of repair it.

In some implementations, the component state information 120 includes information to be used in determining whether an object 106 is a total loss or not. The component state information 120 may also include a probability that the object 106 is a total loss, the proportion of the object 106 (e.g., weightage) that is damaged, and/or an overall condition of the object 106.

In some implementations, the state 204 may be a binary indication of whether the corresponding component is damaged (e.g., 0 or 1, yes or no, etc.). Table 1, below, shows example component state information 120 listing a state 204 (e.g., labeled "ATR_VAL_TXT") for each of a plurality of components identified by component ID 202 (e.g., labeled "ATR_NM").

TABLE 1

| ATR_GRP_DC | ATR_TYP_DC | ATR_NM | ATR_VAL_TXT |
|---|---|---|---|
| Damage | vehicleCondition | bedDamageInd | N |
| Damage | vehicleCondition | damageInd | Y |
| Damage | vehicleCondition | fluidLeakageInd | U |
| Damage | vehicleCondition | frontBumperDamageInd | N |
| Damage | vehicleCondition | hoodDamageInd | N |
| Damage | vehicleCondition | leftFrontCornerDamageInd | N |
| Damage | vehicleCondition | leftFrontSideDamageInd | N |
| Damage | vehicleCondition | leftRearCornerDamageInd | N |
| Damage | vehicleCondition | leftRearSideDamageInd | N |
| Damage | vehicleCondition | leftSideDamageInd | N |
| Damage | vehicleCondition | moderateFrontImpactIndicator | N |
| Damage | vehicleCondition | rearBumperDamageInd | N |
| Damage | vehicleCondition | rearCargoDoorDamageInd | N |
| Damage | vehicleCondition | rearWindowDamageInd | N |
| Damage | vehicleCondition | rightFrontCornerDamageInd | Y |
| Damage | vehicleCondition | rightFrontSideDamageInd | Y |
| Damage | vehicleCondition | rightRearCornerDamageInd | N |
| Damage | vehicleCondition | rightRearSideDamageInd | Y |
| Damage | vehicleCondition | rightSideDamageInd | Y |
| Damage | vehicleCondition | roofDamageInd | N |
| Damage | vehicleCondition | sideDamageInd | Y |
| Damage | vehicleCondition | typeOfDamage | BodyOnly |
| Damage | vehicleCondition | vehicleDrivableIndicator | N |
| Damage | vehicleCondition | wheelsOrTiresDamageInd | Y |
| Damage | vehicleCondition | windShieldDamageInd | N |

Figure 3:
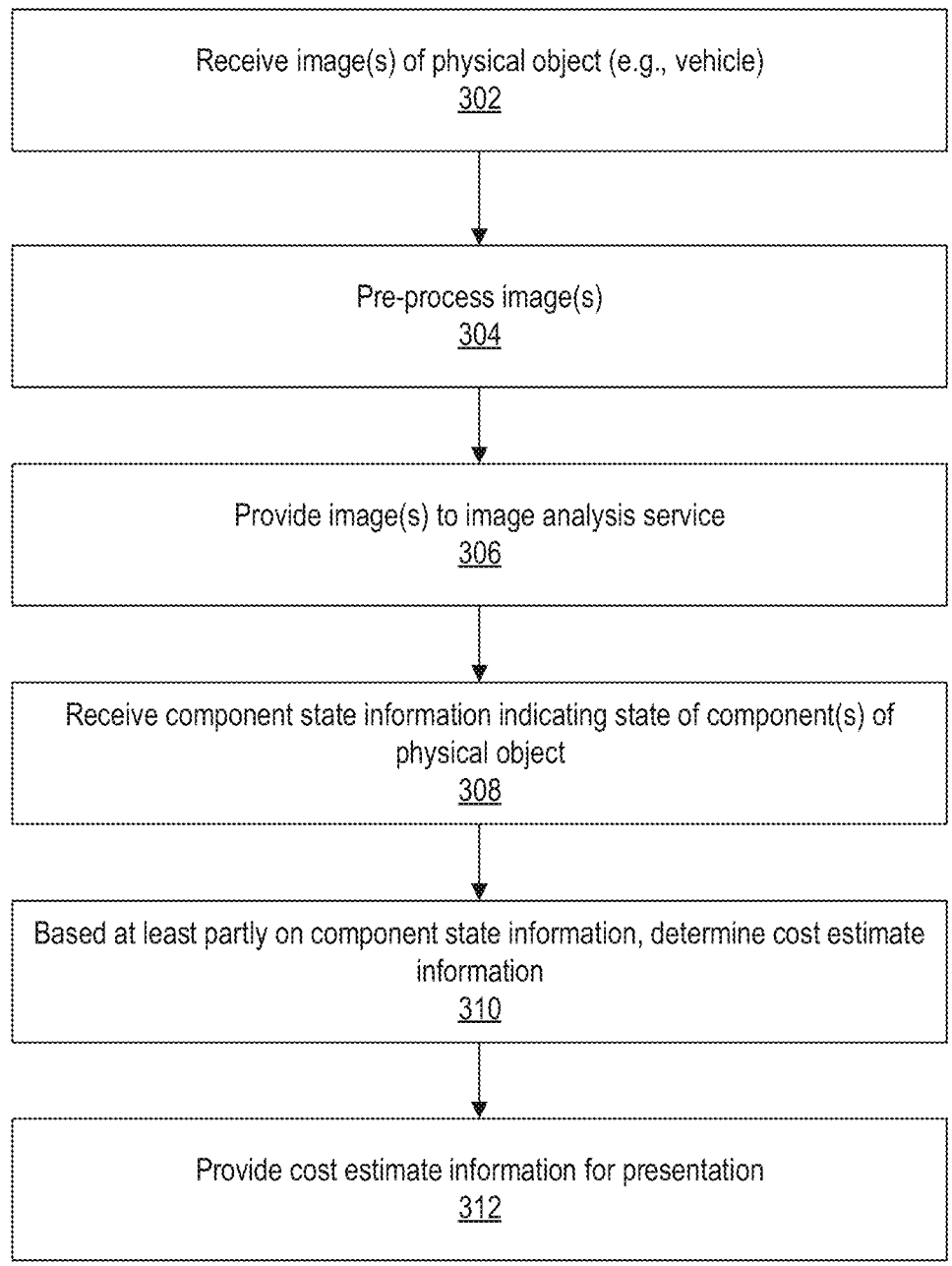
FIG. 3 depicts a flow diagram of an example process for an estimation based on image analysis, according to implementations of the present disclosure.

FIG. 3 depicts a flow diagram of an example process for estimation based on image analysis, according to implementations of the present disclosure. Operations of the process may be performed by one or more of the estimation engine 116, the application 110, the image analysis service 118, and/or other software module(s) executing on the server device(s) 114, the user device 104, or elsewhere.

The image(s) 112 of the object 106 may be received (302). In some implementations, the image(s) 112 may be pre-processed (304) as described above. The image(s) 112, and/or pre-processed image(s) 112, may be provided (306) to the image analysis service 118. The component state information 120 may be received (308) from the image analysis service 118. As described above, the component state information 120 may be generated based on the service's analysis of the image(s) 112. Based at least partly on the component state information 120, the cost estimate information 122 may be determined (310). In some instances, the determination of the component state information 120 may be further based on the other input data 124, as described above. The cost estimate information 122 may be communicated or otherwise provided (312) for presentation through a UI on one or more computing devices. In some instances, the cost estimate information 122 may also be stored in memory for subsequent access. In some instances, providing the cost estimate information 122 may include communicating the cost estimate information 122 to a service provider, such as an automotive repair shop, garage, body shop, or other service that is to repair (or replace) the object 106 and/or component(s) of the object 106.

Figure 4:
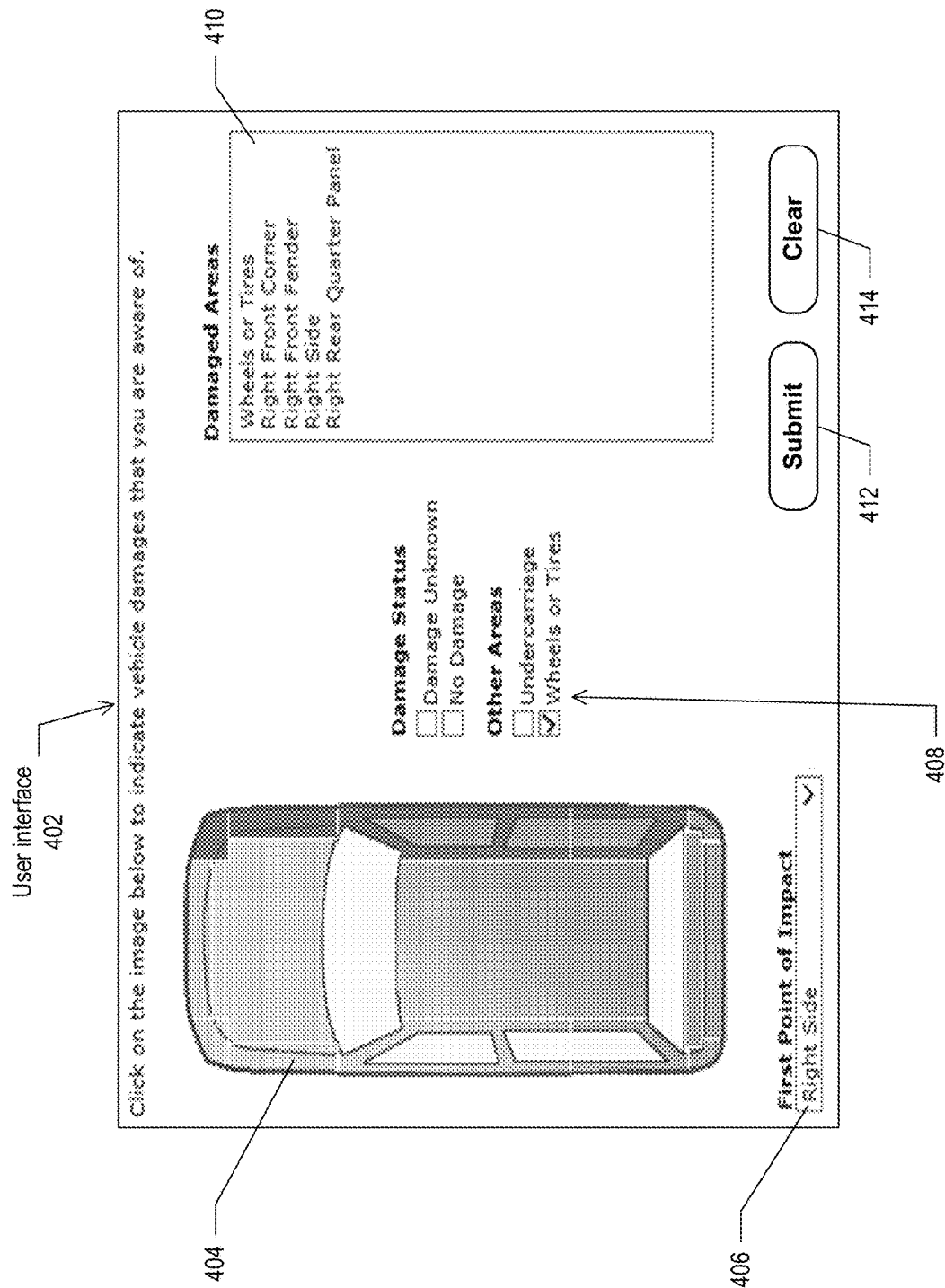
FIG. 4 depicts an example user interface, according to implementations of the present disclosure.

FIG. 4 depicts an example UI 402, according to implementations of the present disclosure. The UI 402 may be presented by the application 110, and may enable the user 102 to specify information to be sent to the estimation engine 116 to be used for determining the cost estimate information 122.

As shown in the example, the UI 402 may present an element 404 that is an image of the vehicle or other object 106. The element 404 may be clickable by the user 102 to select various components of the object 106. For each selected component, the UI 402 may present an element 408 that enables the user 102 to specify whether there is any known damage (e.g., previous and/or current damage) to the selected component. For each damaged component, the UI 402 may prompt the user 102 to capture one or more images 112 of the component for further analysis and cost estimation. The UI 402 may provide an element 406 to enable the user 102 to select the first point of impact and/or other information describing the accident or other damage-causing incident. The UI 402 may also provide an element 410 that lists the damaged areas of the object 106 that have been indicated by the user 102. After the information has been provided, the user 102 may click a submit button 412 to cause the image(s) 112 and/or other provided information to be sent to the estimation engine 116. A clear button 414 may be clicked to clear and/or cancel the entered information.

Figure 5:
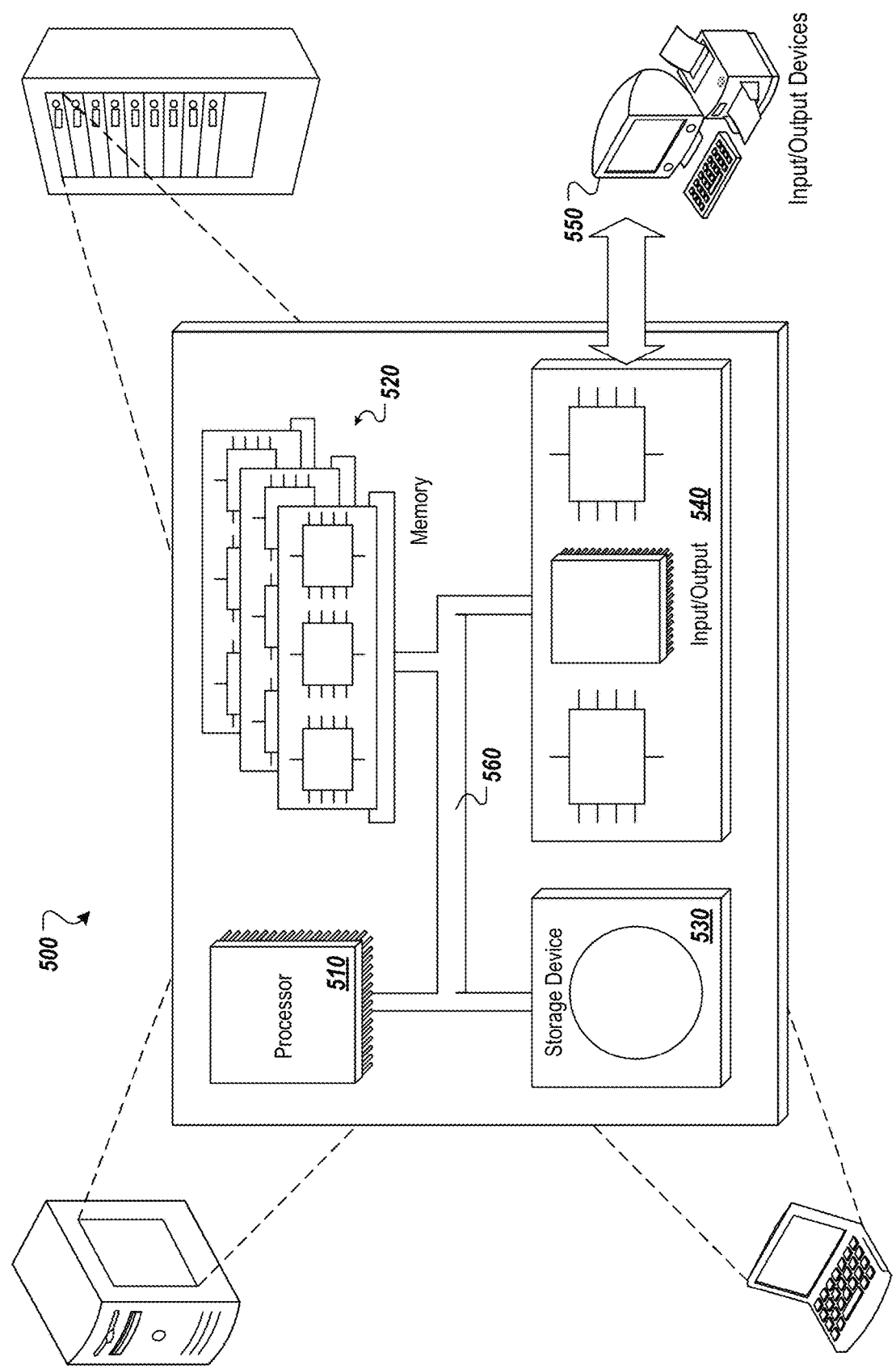
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 104, the server device(s) 114, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A computer-implemented method comprising:
receiving, by at least one processor, a request including at least one image of an object, the at least one image generated using an image capture device associated with a user;
determining, by the at least one processor, whether the request is fraudulent based on a correlation between damage to the object depicted in the at least one image and telematics data obtained by one or more sensors positioned on the object, wherein determining whether the request is fraudulent comprises:
determining that the damage depicted in the at least one image is at a first location on the object;
at least one of:
determining, based on the telematics data, that a force was applied to the object at a second location on the object, or
determining, based on the telematics data, a failure of one or more components of the object at the second location on the object;
comparing the first location and the second location, and
determining whether the request is fraudulent based on the comparison of the first location and the second location;
subsequent to determining whether the request is fraudulent, transmitting, by the at least one processor, the at least one image to a computer-implemented image analysis system and receiving, in response, information indicating a state of the object; and
transmitting, by the at least one processor, the information indicating the state of the object for presentation on a computing device.

2. The computer-implemented method of claim 1, wherein the object comprises a vehicle.

3. The computer-implemented method of claim 1, wherein the one or more sensors comprise at least one of:
an accelerometer, or
a fault sensor.

4. The computer-implemented method of claim 1, wherein the information indicating the state of the object comprises an indication of damage to the object.

5. The computer-implemented method of claim 1, wherein the information indicating the state of the object comprises a confidence level associated with the state of the object.

6. A system comprising:
at least one processor; and
a memory communicatively coupled to the at least one processor, the memory storing instructions which, when executed by the at least one processor, cause the at least one processor to perform operations comprising:
receiving a request including at least one image of an object, the at least one image generated using an image capture device associated with a user;
determining whether the request is fraudulent based on a correlation between damage to the object depicted in the at least one image and telematics data obtained by one or more sensors positioned on the object, wherein determining whether the request is fraudulent comprises:
determining that the damage depicted in the at least one image is at a first location on the object;
at least one of:
determining, based on the telematics data, that a force was applied to the object at a second location on the object, or
determining, based on the telematics data, a failure of one or more components of the object at the second location on the object;
comparing the first location and the second location, and
determining whether the request is fraudulent based on the comparison of the first location and the second location;
subsequent to determining whether the request is fraudulent, transmitting the at least one image to a computer-implemented image analysis system and receiving, in response, information indicating a state of the object; and
transmitting the information indicating the state of the object for presentation on a computing device.

7. The system of claim 6, wherein the object comprises a vehicle.

8. The system of claim 6, wherein the one or more sensors comprise at least one of:
an accelerometer, or
a fault sensor.

9. The system of claim 6, wherein the information indicating the state of the object comprises an indication of damage to the object.

10. The system of claim 6, wherein the information indicating the state of the object comprises a confidence level associated with the state of the object.

11. One or more non-transitory computer-readable media storing instructions which, when executed by at least one processor, cause the at least one processor to perform operations comprising:
receiving a request including at least one image of an object, the at least one image generated using an image capture device associated with a user;
determining whether the request is fraudulent based on a correlation between damage to the object depicted in the at least one image and telematics data obtained by one or more sensors positioned on the object, wherein determining whether the request is fraudulent comprises:
determining that the damage depicted in the at least one image is at a first location on the object;
at least one of:
determining, based on the telematics data, that a force was applied to the object at a second location on the object, or
determining, based on the telematics data, a failure of one or more components of the object at the second location on the object;
comparing the first location and the second location, and
determining whether the request is fraudulent based on the comparison of the first location and the second location;
subsequent to determining whether the request is fraudulent, transmitting the at least one image to a computer-implemented image analysis system and receiving, in response, information indicating a state of the object; and
transmitting the information indicating the state of the object for presentation on a computing device.

12. The one or more non-transitory computer-readable media of claim 11, wherein the object comprises a vehicle.

13. The one or more non-transitory computer-readable media of claim 11, wherein the one or more sensors comprise at least one of:
an accelerometer, or
a fault sensor.

14. The one or more non-transitory computer-readable media of claim 11, wherein the information indicating the state of the object comprises an indication of damage to the object.

15. The one or more non-transitory computer-readable media of claim 11, wherein the information indicating the state of the object comprises a confidence level associated with the state of the object.

* * * * *